US00RE47937E

(19) United States
(12) Reissued Patent
Ramachandran et al.

(10) Patent Number: US RE47,937 E
(45) Date of Reissued Patent: *Apr. 7, 2020

(54) PROVIDING CONTENT TO A USER ACROSS MULTIPLE DEVICES

(71) Applicant: Google LLC, Mountain View, CA (US)

(72) Inventors: Vinod Kumar Ramachandran, Sunnyvale, CA (US); Ping Wu, Saratoga, CA (US); Nareshkumar Rajkumar, San Jose, CA (US)

(73) Assignee: Google LLC, Mountain View, CA (US)

( * ) Notice: This patent is subject to a terminal disclaimer.

(21) Appl. No.: 15/488,366

(22) Filed: Apr. 14, 2017

Related U.S. Patent Documents

Reissue of:
(64) Patent No.: 9,009,258
Issued: Apr. 14, 2015
Appl. No.: 13/413,459
Filed: Mar. 6, 2012

(51) Int. Cl.
*H04N 21/239* (2011.01)
*H04L 9/06* (2006.01)
*H04L 29/06* (2006.01)

(52) U.S. Cl.
CPC ..... *H04N 21/2396* (2013.01); *H04L 63/0421* (2013.01); *H04L 63/102* (2013.01)

(58) Field of Classification Search
CPC ..... H04N 21/2396; H04L 63/102; H04L 63/0421

(Continued)

(56) References Cited

U.S. PATENT DOCUMENTS 5,408,950 A 4/1995 Porto
5,892,900 A 4/1999 Ginter et al.
(Continued)

FOREIGN PATENT DOCUMENTS

CN 102365637 A 2/2012
EP 2 270 741 A1 1/2011
(Continued)

OTHER PUBLICATIONS

Examination Report issued for AU Application No. 2013230980 dated Nov. 11, 2016. (3 pages).

(Continued)

*Primary Examiner* — Robert L Nasser
(74) *Attorney, Agent, or Firm* — Foley & Lardner LLP

(57) ABSTRACT

Methods, systems, and apparatus, including computer programs encoded on a computer-readable storage medium, and including a method for providing content. The method comprises receiving a first login request from a first device used by a user, the request being associated with a first anonymous identifier associated with the first device, and determining a user tag for the user, that does not include any personally identifiable information associated with the user. The method further comprises receiving a second login request from a second different device used by the user, the request being associated with a second different anonymous identifier associated with the second different device, and storing an association between the user tag, the first anonymous identifier and the second different anonymous identifier. The method further comprises receiving a request for content from either the first or second different device and providing content in response to the request using the association.

22 Claims, 8 Drawing Sheets

(58) Field of Classification Search
USPC ..... 705/14.53–14.54; 709/217
See application file for complete search history.

(56) References Cited

U.S. PATENT DOCUMENTS

| | | | | |
|---|---|---|---|---|
| 6,223,178 | B1 | 4/2001 | Himmel et al. | |
| 6,324,566 | B1 | 11/2001 | Himmel et al. | |
| 6,486,891 | B1 | 11/2002 | Rice | |
| 7,308,261 | B2 | 12/2007 | Henderson et al. | |
| 7,711,707 | B2 | 5/2010 | Kelley et al. | |
| 7,861,260 | B2 | 12/2010 | Shkedi | |
| 8,041,602 | B2 | 10/2011 | Haley et al. | |
| 8,065,185 | B2 | 11/2011 | Foladare et al. | |
| 8,107,408 | B2 * | 1/2012 | Chindapol et al. | 370/315 |
| 8,122,020 | B1 | 2/2012 | Donsbach et al. | |
| 8,271,328 | B1 | 9/2012 | Baltz et al. | |
| 8,321,684 | B2 | 11/2012 | Mumm et al. | |
| 8,423,408 | B1 | 4/2013 | Barnes et al. | |
| 8,666,812 | B1 | 3/2014 | Gandhi | |
| 2002/0111907 | A1 * | 8/2002 | Ling | G06Q 20/04 705/41 |
| 2003/0061275 | A1 | 3/2003 | Brown et al. | |
| 2003/0149781 | A1 | 8/2003 | Yared et al. | |
| 2003/0217687 | A1 | 11/2003 | Segall | |
| 2004/0088363 | A1 | 5/2004 | Doemling et al. | |
| 2004/0122735 | A1 | 6/2004 | Meshkin | |
| 2004/0204997 | A1 | 10/2004 | Blaser et al. | |
| 2005/0021747 | A1 | 1/2005 | Jave | |
| 2005/0044423 | A1 | 2/2005 | Mellmer et al. | |
| 2005/0076248 | A1 | 4/2005 | Cahill et al. | |
| 2005/0208940 | A1 | 9/2005 | Takase et al. | |
| 2005/0268102 | A1 | 12/2005 | Downey | |
| 2005/0278731 | A1 | 12/2005 | Cameron et al. | |
| 2006/0036857 | A1 * | 2/2006 | Hwang | 713/168 |
| 2006/0101287 | A1 | 5/2006 | Morten | |
| 2006/0136717 | A1 | 6/2006 | Buer et al. | |
| 2006/0282674 | A1 * | 12/2006 | Saito | G06T 1/0071 713/176 |
| 2007/0124201 | A1 | 5/2007 | Hu et al. | |
| 2007/0136305 | A1 | 6/2007 | Kelley et al. | |
| 2007/0174614 | A1 | 7/2007 | Duane et al. | |
| 2007/0185988 | A1 * | 8/2007 | Maring | G06Q 30/02 709/224 |
| 2007/0240226 | A1 | 10/2007 | Song et al. | |
| 2008/0140476 | A1 | 6/2008 | Anand et al. | |
| 2008/0172373 | A1 | 7/2008 | Jenson et al. | |
| 2008/0235243 | A1 | 9/2008 | Lee et al. | |
| 2009/0037254 | A1 * | 2/2009 | Colando | G06Q 30/02 705/7.32 |
| 2009/0132813 | A1 | 5/2009 | Schibuk | |
| 2009/0150238 | A1 | 6/2009 | Marsh et al. | |
| 2009/0157502 | A1 | 6/2009 | Cooper et al. | |
| 2009/0204804 | A1 | 8/2009 | Okubo | |
| 2009/0234909 | A1 * | 9/2009 | Strandell et al. | 709/203 |
| 2009/0298480 | A1 | 12/2009 | Khambete et al. | |
| 2009/0307759 | A1 | 12/2009 | Schnell et al. | |
| 2009/0320091 | A1 | 12/2009 | Torres et al. | |
| 2010/0057843 | A1 | 3/2010 | Landsman et al. | |
| 2010/0088519 | A1 | 4/2010 | Tsuruoka et al. | |
| 2010/0179875 | A1 * | 7/2010 | Naito | G06Q 30/02 705/14.54 |
| 2010/0186084 | A1 * | 7/2010 | Hamid | G06F 12/1458 726/19 |
| 2010/0211960 | A1 | 8/2010 | Sirajuddin et al. | |
| 2010/0251333 | A1 | 9/2010 | Miura et al. | |
| 2010/0293049 | A1 | 11/2010 | Maher et al. | |
| 2011/0010243 | A1 | 1/2011 | Wilburn et al. | |
| 2011/0047032 | A1 | 2/2011 | Kumar et al. | |
| 2011/0106911 | A1 * | 5/2011 | Sung | G06F 16/435 709/217 |
| 2011/0110515 | A1 | 5/2011 | Tidwell et al. | |
| 2011/0153428 | A1 | 6/2011 | Ramer et al. | |
| 2011/0154499 | A1 | 6/2011 | Rohan et al. | |
| 2011/0213977 | A1 | 9/2011 | Little | |
| 2011/0231240 | A1 | 9/2011 | Schoen et al. | |
| 2011/0231478 | A1 | 9/2011 | Wheeler et al. | |
| 2011/0251878 | A1 | 10/2011 | Subramanian et al. | |
| 2011/0289314 | A1 * | 11/2011 | Whitcomb | 713/155 |
| 2012/0023547 | A1 | 1/2012 | Maxson et al. | |
| 2012/0030554 | A1 | 2/2012 | Toya | |
| 2012/0054680 | A1 | 3/2012 | Moonka et al. | |
| 2012/0060120 | A1 | 3/2012 | Aravamudan et al. | |
| 2012/0096088 | A1 | 4/2012 | Fahmy | |
| 2012/0096491 | A1 | 4/2012 | Shkedi | |
| 2012/0158491 | A1 | 6/2012 | Goulden et al. | |
| 2012/0167185 | A1 * | 6/2012 | Menezes et al. | 726/5 |
| 2012/0253920 | A1 | 10/2012 | Yarvis et al. | |
| 2012/0253926 | A1 | 10/2012 | Chen et al. | |
| 2012/0321143 | A1 | 12/2012 | Krupka et al. | |
| 2012/0323674 | A1 | 12/2012 | Simmons et al. | |
| 2013/0006754 | A1 * | 1/2013 | Horvitz | G06Q 30/00 705/14.43 |
| 2013/0036434 | A1 | 2/2013 | Shkedi et al. | |
| 2013/0055309 | A1 * | 2/2013 | Dittus | 725/35 |
| 2013/0124327 | A1 * | 5/2013 | Doughty | G06Q 30/0269 705/14.64 |
| 2013/0138569 | A1 * | 5/2013 | Yan | G06Q 30/02 705/50 |
| 2013/0238745 | A1 | 9/2013 | Ramachandran et al. | |
| 2013/0252628 | A1 | 9/2013 | Kuehnel | |
| 2017/0330225 | A1 * | 11/2017 | Krosky | G06Q 30/0251 |

FOREIGN PATENT DOCUMENTS

| | | | |
|---|---|---|---|
| EP | 2270741 | | 1/2011 |
| JP | 2004-070441 | A | 3/2004 |
| JP | 2005-267433 | | 9/2005 |
| JP | 2007-102780 | A | 4/2007 |
| JP | 2007-510973 | A | 4/2007 |
| JP | 2008-234641 | A | 10/2008 |
| JP | 2010-501939 | | 1/2010 |
| JP | 2010-515977 | A | 5/2010 |
| JP | 2010-237811 | A | 10/2010 |
| JP | 2010-539601 | | 12/2010 |
| JP | 2011-504625 | A | 2/2011 |
| JP | 2011-096093 | | 5/2011 |
| JP | 2011-096093 | A | 5/2011 |
| JP | 2012-518237 | A | 8/2012 |
| JP | 2012-226505 | A | 11/2012 |
| JP | 2013-519171 | | 5/2013 |
| KR | 10-2012-0004054 | | 1/2012 |
| KR | 2012/0004054 | A | 1/2012 |
| WO | WO-2005/040976 | | 5/2005 |
| WO | WO-2007/059087 | A2 | 5/2007 |
| WO | WO-2009/036190 | | 3/2009 |
| WO | WO-2009/057485 | | 5/2009 |
| WO | WO-2009/065045 | | 5/2009 |
| WO | WO 2011/109865 | | 9/2011 |
| WO | WO-2011/109865 | A1 | 9/2011 |

OTHER PUBLICATIONS

Non-Final Office Action for JP Application No. 2014-561080 dated Dec. 5, 2016. (5 pages).

Non-Final Office Action on U.S. Appl. No. 15/488,386 dated Oct. 31, 2018.

Notice of Allowance on U.S. Appl. No. 15/488,386 dated Jul. 8, 2019 (11 pages).

Office Action on JP Appln. Ser. No. 2018-165790 dated Aug. 19, 2019 (2 pages).

Ebbert, J., "Is Audience Buying Possible in Mobile Advertising?," AdExchanger.com, dated Aug. 3, 2011 [online] [Retrieved on Dec. 2, 2011], URL: http://www.adexchanger.com/mobile/audience-buying/ (9 pages).

Examination Report for Australian Application No. 2018200833 dated Dec. 20, 2019 (7 pages).

Final Office Action on U.S. Appl. No. 15/488,386 dated Apr. 5, 2019 (13 pages).

International Search Report and Written Opinion for Appln. Ser. No. PCT/US2013/029384, dated Jun. 17, 2013 (12 pages).

(56) References Cited

OTHER PUBLICATIONS

International Search Report for Appln. Ser. No. PCT/US2013/038457, dated Sep. 17, 2013 (10 pages).
International Search Report for Appln. Ser. No. PCT/US2013/038461, dated Sep. 17, 2013 (12 pages).
International Search Report for Appln. Ser. No. PCT/US2013/038482, dated Aug. 12, 2013 (10 pages).
Marshall, J., "Device Fingerprinting Could Be Cookie Killer," ClickZ.com, dated Mar. 2, 2011 [online] [Retrieved on Dec. 2, 2011], URL: http://www.clickz.com/clickz/news/2030243/device-fingerprinting-cookie-killer/ (4 pages).
Non-Final Office Action on U.S. Appl. No. 13/413,459, dated Aug. 15, 2014 (29 pages).
Notice of Allowance on U.S. Appl. No. 13/413,459, dated Dec. 9, 2014 (19 pages).

* cited by examiner

PROVIDING CONTENT TO A USER ACROSS MULTIPLE DEVICES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED PATENT APPLICATIONS*

*This application is a Broadening Reissue of U.S. Pat. No. 9,009,258 (previously U.S. patent application Ser. No. 13/413,459) titled "PROVIDING CONTENT TO A USER ACROSS MULTIPLE DEVICES" issued on Apr. 14, 2015, which is incorporated herein by reference in its entirety.*

*Notice: More than one reissue application has been filed for the reissue of U.S. Pat. No. 9,009,258. The reissue applications with application Ser. Nos. 15/488,366 (the present application) and 15/488,386, respectively, are both reissues of U.S. Pat. No. 9,009,258.*

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Content item slots can be allocated to content sponsors as part of a reservation system, or in an auction. For example, content sponsors can provide bids specifying amounts that the sponsors are respectively willing to pay for presentation of their content. In turn, an auction can be run, and the slots can be allocated to sponsors according, among other things, to their bids and/or the relevance of the sponsored content to content presented on a page hosting the slot or a request that is received for the sponsored content. The content can then be provided to the user on any devices associated with the user such as a home personal computer (PC), a smartphone, a laptop computer, or some other user device.

SUMMARY

In general, one innovative aspect of the subject matter described in this specification can be implemented in methods that include a method for providing content. The method comprises receiving a first login request from a first device used by a user for logging into a service, the first login request being associated with a first anonymous identifier associated with the first device. The method further comprises determining, using one or more processors, a user tag for the user, wherein the user tag does not include any personally identifiable information associated with the user. The method further comprises receiving a second login request from a second different device used by the user, the second login request being associated with a second different anonymous identifier associated with the second different device. The method further comprises storing an association between the user tag, the first anonymous identifier and the second different anonymous identifier. The method further comprises receiving a request for content from either the first device including the first anonymous identifier or the second different device including the second different anonymous identifier. The method further comprises providing, using the one or more processors, content in response to the request using the association.

These and other implementations can each optionally include one or more of the following features. The first and second different anonymous identifiers can be associated with different browsers. Receiving the login request can include receiving a request to log into a social service. Determining a user tag for the user further can include determining a random or pseudo-random number based at least in part on the information and providing the random or pseudo-random number as the user tag. Determining a user tag for the user can further include applying a one-way function to at least a portion of the information producing a result and using the result as the user tag. The one-way function can be a hash function. The portion of information can be a login identifier associated with the user. The portion of information can be an email address of the user. Storing the association can include storing the user tag, the first anonymous identifier, and the second different anonymous identifier as an entry in a table. Storing the association can include mapping the user tag to both the first and the second different anonymous identifiers. Storing the association can include removing the user tag after expiration of a first time period. Storing the association can include removing the second different anonymous identifier after expiration of a second time period. The first and the second time periods can be the same. The first and the second time periods can expire at logout by the user from the service. The first and the second time periods can expire after an amount of time has passed since login that would enable a user to have logged in from multiple different devices. The first and second different anonymous identifiers can be selected from the group comprising a browser cookie and a device identifier. The method can further comprise: receiving a login request from a third device used by the user, the login request being associated with a third different anonymous identifier associated with the third device; storing an association between the user tag, the first anonymous identifier, the second different anonymous identifier and the third different anonymous identifier; receiving a request for content from either the first device including the first anonymous identifier, the second different device including the second different anonymous identifier, or the third different device including the third different anonymous identifier; and providing content in response to the request and using the association. Receiving a request for content can include receiving a request for advertising content. Receiving a request for content can include receiving a request from the first device including the first anonymous identifier, where the first anonymous identifier is a cookie. Providing content in response to the request can further include using information about the user to provide content to the user.

In general, another innovative aspect of the subject matter described in this specification can be implemented in methods that include another method for providing content. The method comprises linking, using one or more processors, multiple anonymous identifiers associated with a user tag by a service. The method further comprises receiving, at the service, requests for content attributable to the user tag, wherein each request includes one of the anonymous identifiers. The method further comprises providing, using the one or more processors, content responsive to the received requests and based on the linking.

These and other implementations can each optionally include one or more of the following features. Linking multiple anonymous identifiers can include receiving a login request from the user from plural different devices, determining the user tag, wherein the user tag does not include any personally identifiable information associated with a user, and mapping the user tag to an anonymous identifier associated with each login request. The multiple anonymous identifiers can be selected from the group comprising browser cookies and device identifiers. Determining a user tag can include applying a one-way function to unique information associated with the user and using a result as the user tag.

In general, another innovative aspect of the subject matter described in this specification can be implemented in methods that include another method for providing content. The method comprises receiving a first login request from a first device used by a user, the first login request being associated with a first anonymous identifier. The method further comprises determining, using one or more processors, a user tag for the user and providing the user tag to the first device, wherein the user tag does not include any personally identifiable information associated with the user. The method further comprises receiving a second login request from a second different device used by the user, the second login request being associated with a second different anonymous identifier. The method further comprises determining that the user has logged into the second different device. The method further comprises storing an association between the user tag, the first anonymous identifier and the second different anonymous identifier. The method further comprises receiving a request for content from either the first device using the first anonymous identifier or the second different device using the second different anonymous identifier. The method further comprises providing, using the one or more processors, content in response to the request for content using either the first anonymous identifier or the second different anonymous identifier and based on the association.

In general, another innovative aspect of the subject matter described in this specification can be implemented in methods that include another method for providing content. The method comprises receiving a request to log into a service, the request from a user executing a first client process on a client device. The method further comprises, responsive to the request and using one or more processors, returning a client identifier to the client device for storage on the client device, the client identifier identifying the user to the service for this session. The method further comprises, after logging in, receiving one or more requests for content from the client device, where each request includes the client identifier and a cookie associated with a given session or device. The method further comprises mapping the client identifier to the cookie and storing the mapping. The method further comprises, at a subsequent time, receiving a subsequent request to log into the service, the subsequent request being from the user and associated with a second client process on either a different client device or through a different browser executed on the client device. The method further comprises responsive to the subsequent request, returning the client identifier to the client device for storage on the client device, the client identifier identifying the user to the service for this subsequent session. The method further comprises receiving one or more subsequent requests for content from the user, where each subsequent request includes the client identifier and a second different cookie associated with the subsequent session or device. The method further comprises mapping, using the one or more processors, the client identifier to the second different cookie and storing the mapping. The method further comprises using the mapping to deliver content to the user.

These and other implementations can each optionally include one or more of the following features. The client identifier can be a cookie. The client identifier has no personally identifiable information associated with the user. The mapping can include providing content to the user based on the mapping. Using the mapping can include using the mapping for conversion tracking, frequency capping, demographic and interest category inferences, or remarketing.

In general, another innovative aspect of the subject matter described in this specification can be implemented in systems that include a system for providing content. The system includes a user login service for providing access to a user's online resources, determining a user tag for the user that does not include personally identifiable information associated with the user, and mapping the user tag to anonymous identifiers associated with multiple devices used by the user. The system further includes a content management system for providing content in response to requests for content by the user from any of the multiple devices associated with the user and based on the mapping.

These and other implementations can each optionally include one or more of the following features. The user's online resources can be selected from a group comprising Web services, e-mail, social networks or business applications. The content can be an advertisement.

In general, another innovative aspect of the subject matter described in this specification can be implemented in computer program products that include a computer program product tangibly embodied in a computer-readable storage device and comprising instructions. The instructions, when executed by a processor, cause the processor to: receive a first login request from a first device used by a user for logging into a service, the first login request being associated with a first anonymous identifier associated with the first device; determine a user tag for the user, wherein the user tag does not include any personally identifiable information associated with the user; receive a second login request from a second different device used by the user, the second login request being associated with a second different anonymous identifier associated with the second different device; store an association between the user tag, the first anonymous identifier and the second different anonymous identifier; receive a request for content from either: the first device including the first anonymous identifier; or the second different device including the second different anonymous identifier; and provide content in response to the request using the association.

In general, another innovative aspect of the subject matter described in this specification can be implemented in computer program products that include a computer program product tangibly embodied in a computer-readable storage device and comprising instructions. The instructions, when executed by a processor, cause the processor to: link multiple anonymous identifiers associated with a user tag by a service; receive, at the service, requests for content attributable to the user tag, wherein each request includes one of the anonymous identifiers; and provide content responsive to the received requests and based on the linking.

In general, another innovative aspect of the subject matter described in this specification can be implemented in computer program products that include a computer program product tangibly embodied in a computer-readable storage device and comprising instructions. The instructions, when executed by a processor, cause the processor to: receive a request to log into a service, the request from a user executing a first client process on a client device; responsive to the request, return a client identifier to the client device for storage on the client device, the client identifier identifying the user to the service for this session; after logging in, receive one or more requests for content from the client device, where each request includes the client identifier and a cookie associated with a given session or device; map the client identifier to the cookie and store the mapping; at a subsequent time, receive a subsequent request to log into the service, the subsequent request being from the user and associated with a second client process on either a different client device or through a different browser executed on the client device; responsive to the subsequent request, return the client identifier to the client device for storage on the client device, the client identifier identifying the user to the service for this subsequent session; receive one or more subsequent requests for content from the user, where each subsequent request includes the client identifier and a second different cookie associated with the subsequent session or device; map the client identifier to the second different cookie and store the mapping; and using the mapping to deliver content to the user.

In general, another innovative aspect of the subject matter described in this specification can be implemented in computer program products that include a computer program product tangibly embodied in a computer-readable storage device and comprising instructions. The instructions, when executed by a processor, cause the processor to: receive a request to log into a service, the request from a user executing a first client process on a client device; responsive to the request, return a client identifier to the client device for storage on the client device, the client identifier identifying the user to the service for this session; after logging in, receive one or more requests for content from the client device, where each request includes the client identifier and a cookie associated with a given session or device; map the client identifier to the cookie and store the mapping; at a subsequent time, receive a subsequent request to log into the service, the subsequent request being from the user and associated with a second client process on either a different client device or through a different browser executed on the client device; responsive to the subsequent request, return the client identifier to the client device for storage on the client device, the client identifier identifying the user to the service for this subsequent session; receive one or more subsequent requests for content from the user, where each subsequent request includes the client identifier and a second different cookie associated with the subsequent session or device; map the client identifier to the second different cookie and store the mapping; and use the mapping to deliver content to the user.

Particular implementations may realize none, one or more of the following advantages. For example, providing content that may be of interest to anonymous audiences can occur across multiple devices, e.g., using user tags that are mapped to a user and/or the user's different devices and that do not include personally identifiable information associated with the user.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
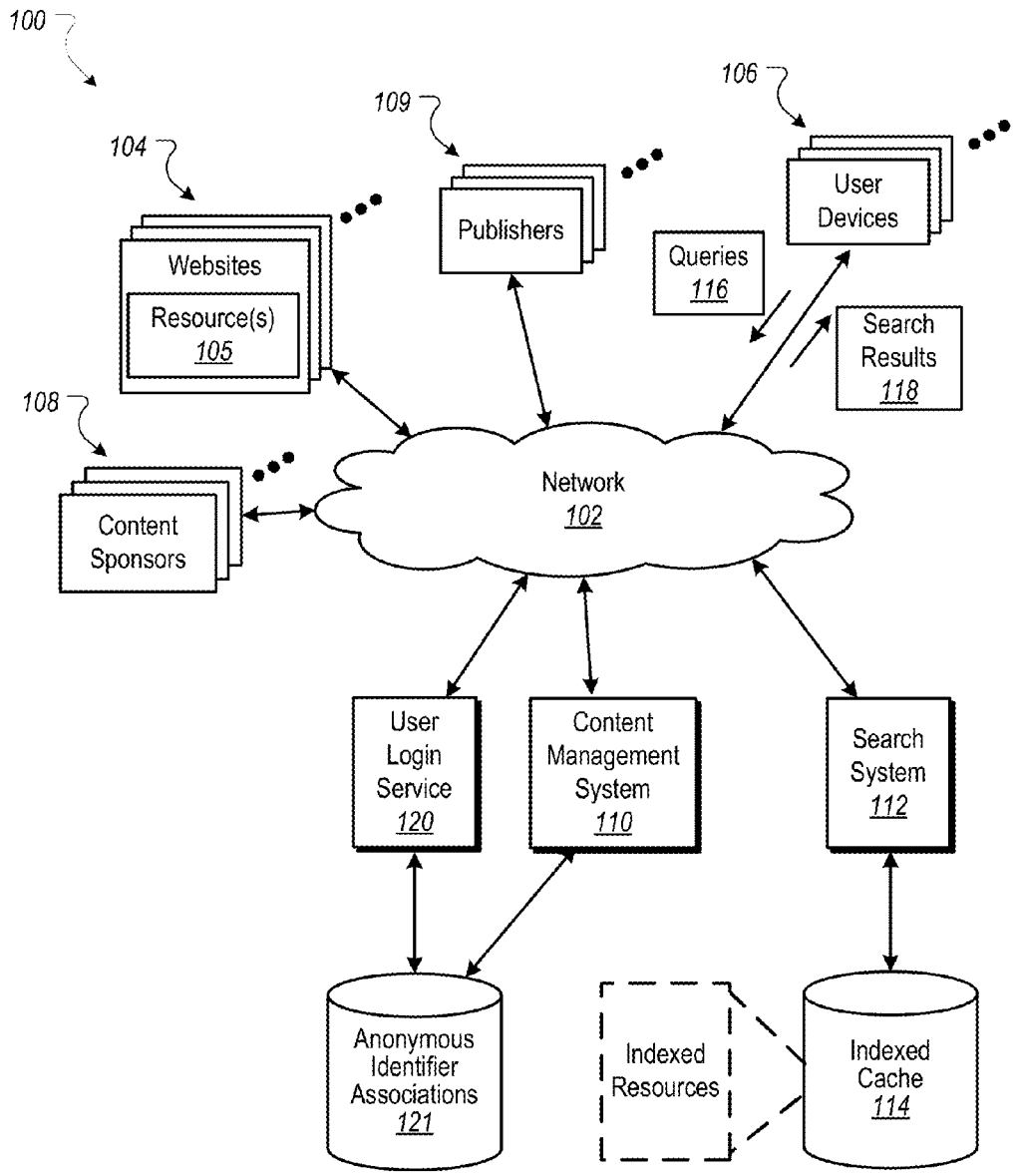
FIG. 1 is a block diagram of an example environment for delivering content.

This document describes methods, processes and systems for providing content to a user having or being associated with multiple devices, without storing personally identifiable information associated with the user to facilitate content selection. For example, when a user logs onto a user service from a first device (e.g., the user's home PC), a user tag can be determined that uses a unique identifier associated with the user (e.g., the user's email address, phone number or other personal information). To determine the user tag, the unique identifier can be obfuscated, e.g., using a one-way hash function to create a random or pseudo-random number. The user tag can be mapped to the user's first device. Subsequently, when the user logs into the service from a second different device, the same user tag can also be mapped to the second different device. The mapping in these examples can use anonymous identifiers (e.g., cookies, browser cookies, device identifiers, etc.) that are associated with each device. As a result, the mapping can identify all of the devices associated with the user without storing personally identifiable information (PII) associated with the user. When content is subsequently provided to the user on any of the devices, information included in the mapping can be used to assist in selecting relevant content to be provided to the user. The selection of relevant content can include decisions regarding how content is delivered to the user, such as and including, limitations on when or how content is delivered. For example, the number of impressions of an advertisement can be limited to a fixed number of impressions per user per time period regardless of how many devices the user uses. In some implementations, users may be provided with an opportunity to opt in/out of programs or features that allow the user to be discovered across multiple devices and/or to be provided content based on such occurrences.

In some implementations, the mapping process can be repeated periodically to ensure that the anonymous identifiers (e.g., cookies) are not stale. For example, cookies on a computer can expire over time, or a user can clear a cookie, resulting in setting a new cookie. Repeating the cookie-mapping process periodically can ensure that the current set of cookies belonging to the user are correctly mapped. While reference is made to cookies, other forms of anonymous identifiers that include or have been derived from the unique identifier or obfuscated identifier associated with a user can be used.

In some implementations, user session history information can be stored anonymously. For example, the session history information can include a user's browsing history, the times that the user has seen a particular advertisement, and other session history information. The information can be stored in association with the anonymous identifiers described herein. In some implementations, session history information associated with the user's session on a first device can be stored in a table that includes the anonymous identifier associated with the first device. The same table can also be used to store the same user's session history information for the user's session on a second device. In some implementations, a separate or the same table can be used to store associations among the anonymous identifiers. In some implementations, anonymous identifiers, the associations, and the session data all can be stored, for example, without any corresponding personally identifiable information for a given user.

As will be described in further detail below, subsequent to the storage of the association and session history information, a request for content (e.g., an advertisement) can be sent from any of the devices associated with that user (the request including an anonymous identifier associated with a given device). In some implementations, the session history information stored in the tables can be used in determining, for example, advertisements that may be of interest to the user responsive to the received request. The determination can include inferences for the user based on the user's stored session history information. In some implementations, the session history information for the user can be aggregated, e.g., by joining tables using the anonymous identifiers. For example, a request for content can be received, and the request can include an anonymous identifier associated with a user's desktop device. The received anonymous identifier can be used to look up the user's other anonymous identifiers (e.g., for mobile and other devices of the user). The retrieved set of anonymous identifiers can be used access to session history information in the other tables (e.g., user browsing history). In some implementations, all of the session history information can be joined together for the respective devices producing aggregated information. In some implementations, the aggregated session history information can be provided to a content management system in order to determine and select eligible content for delivery to the user responsive to the received request. For example, because the session history information can include the number of times that the user has seen a particular advertisement, the content management system can help to avoid selecting an advertisement for the user which has already been presented a predetermined number of times.

In some implementations, aggregating the information can occur on demand, e.g., in real time after a request for content occurs. For example, the user's session history information, stored individually by anonymous identifier in the various tables, can be joined. Aggregating the information in real time can solve issues, for example, related to whether the user has opted out of being provided content that may be of interest to the user and based on the devices used by the user. For example, session history information for a device for which the user has opted out will not be aggregated with other session history information. In some implementations, the information for a user can be aggregated and stored in advance of any requests for content. For example, all of the user session history information can be stored in a third table, e.g., that includes all of the user session history information across all of the user's devices.

FIG. 1 is a block diagram of an example environment 100 for delivering content. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content sponsors 108 (e.g., advertisers), publishers 109, and the content management system 110. The example environment 100 may include many thousands of websites 104, user devices 106, content sponsors 108 and publishers 109.

In some implementations, the example environment 100 further includes a user login service 120 that can provide, for any particular user, access to the user's Web services, e-mail, social networks, business applications or other resources. For example, the user login service 120 can receive login requests from the user, such as through a Web browser or other application running on any device associated with the user. The login request can include, for example, the user's login ID (e.g., a unique identifier, an email address, a phone number, or any other identifier for the user that can be used for verifying the user at login). The user login service 120 can also maintain information related to the devices on which the user is currently logged on, or has been logged into recently. The information can include, for example, a mapping of anonymous identifiers for the devices with a user tag that does not contain personally identifiable information associated with the user. In some implementations, the mapping can be stored, for each user, in a data store of anonymous identifier associations 121, or in some data structure.

In some implementations, the anonymous identifier associations 121 or some other data store can store session history data for each user. For example, the session history data can be an aggregation of the information derived during each of a user's sessions from respective devices. In some implementations, the session history data can include timestamps that can be used, for example, to purge session history data for a user that is older than a threshold age. In some implementations, session history data can exist for as long as the user is logged into a session on one or more devices.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript scripts).

A user device 106 is an electronic device that is under control of a user and is capable of requesting and receiving resources over the network 102. Example user devices 106 include personal computers (PCs), televisions with one or more processors embedded therein or coupled thereto, set-top boxes, mobile communication devices (e.g., smartphones), tablet computers and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 can be data generated by the search system 112 that identifies a resource that is responsive to a particular search query, and includes a link to the resource. In some implementations, the search results 118 include the content itself, such as a map, or an answer, such as in response to a query for a store's products, phone number, address or hours of operation. In some implementations, the content management system 110 can generate search results 118 using information (e.g., identified resources) received from the search system 112. An example search result 118 can include a web page title, a snippet of text or a portion of an image extracted from the web page, and the URL of the web page. Search results pages can also include one or more slots in which other content items (e.g., ads) can be presented. In some implementations, slots on search results pages or other web pages can include content slots for content items that have been provided as part of a reservation process. In a reservation process, a publisher and a content item sponsor enter into an agreement where the publisher agrees to publish a given content item (or campaign) in accordance with a schedule (e.g., provide 1000 impressions by date X) or other publication criteria. In some implementations, content items that are selected to fill the requests for content slots can be selected based, at least in part, on priorities associated with a reservation process (e.g., based on urgency to fulfill a reservation).

When a resource 105, search results 118 and/or other content are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. In some implementations, the selection of the eligible content items can further depend on user signals, such as demographic signals and behavioral signals. Other information, such as user identifier information that is associated with the mappings described above, can be used and/or evaluated when selecting eligible content.

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations). The offers represent the amounts that the content sponsors are willing to pay for presentation (or selection) of their content with a resource or search results page. For example, an offer can specify an amount that a content sponsor is willing to pay for each 1000 impressions (i.e., presentations) of the content item, referred to as a CPM bid. Alternatively, the offer can specify an amount that the content sponsor is willing to pay (e.g., a cost per engagement) for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a web page, and consummates a purchase there before leaving that web page. A conversion can also be defined by a content provider to be any measurable or observable user action, such as downloading a white paper, navigating to at least a given depth of a website, viewing at least a certain number of web pages, spending at least a predetermined amount of time on a web site or web page, registering on a website, experiencing media, or performing a social action regarding a content item (e.g., an ad), such as republishing or sharing the content item. Other actions that constitute a conversion can also be used.

In some implementations, the likelihood that a conversion will occur can be improved, such as by recognizing a user when the user has accessed resources using multiple devices. For example, if it is known that a content item (e.g., an advertisement) has already been seen by a user on a first device (e.g., the user's home PC), then a determination can be made (e.g., using parameters) whether or not to provide the same content item to the same user on a different device (e.g., the user's smartphone). This can increase the likelihood of a conversion, for example, by either repeating impressions of an advertisement or avoiding subsequent impressions, depending on how multiple impressions for the advertisement to the same user are predicted to lead to a conversion in either case.

For situations in which the systems discussed here collect personal information about users, the users may be provided with an opportunity to opt in/out of programs or features that may collect personal information (e.g., information about a user's social network, social actions or activities, a user's preferences or a user's current location). In addition, certain data may be anonymized in one or more ways before it is stored or used, so that personally identifiable information associated with the user is removed. For example, a user's identity may be anonymized so that the no personally identifiable information can be determined for the user, or a user's geographic location may be generalized where location information is obtained (such as to a city, ZIP code, or state level), so that a particular location of a user cannot be determined.

Figure 2A:
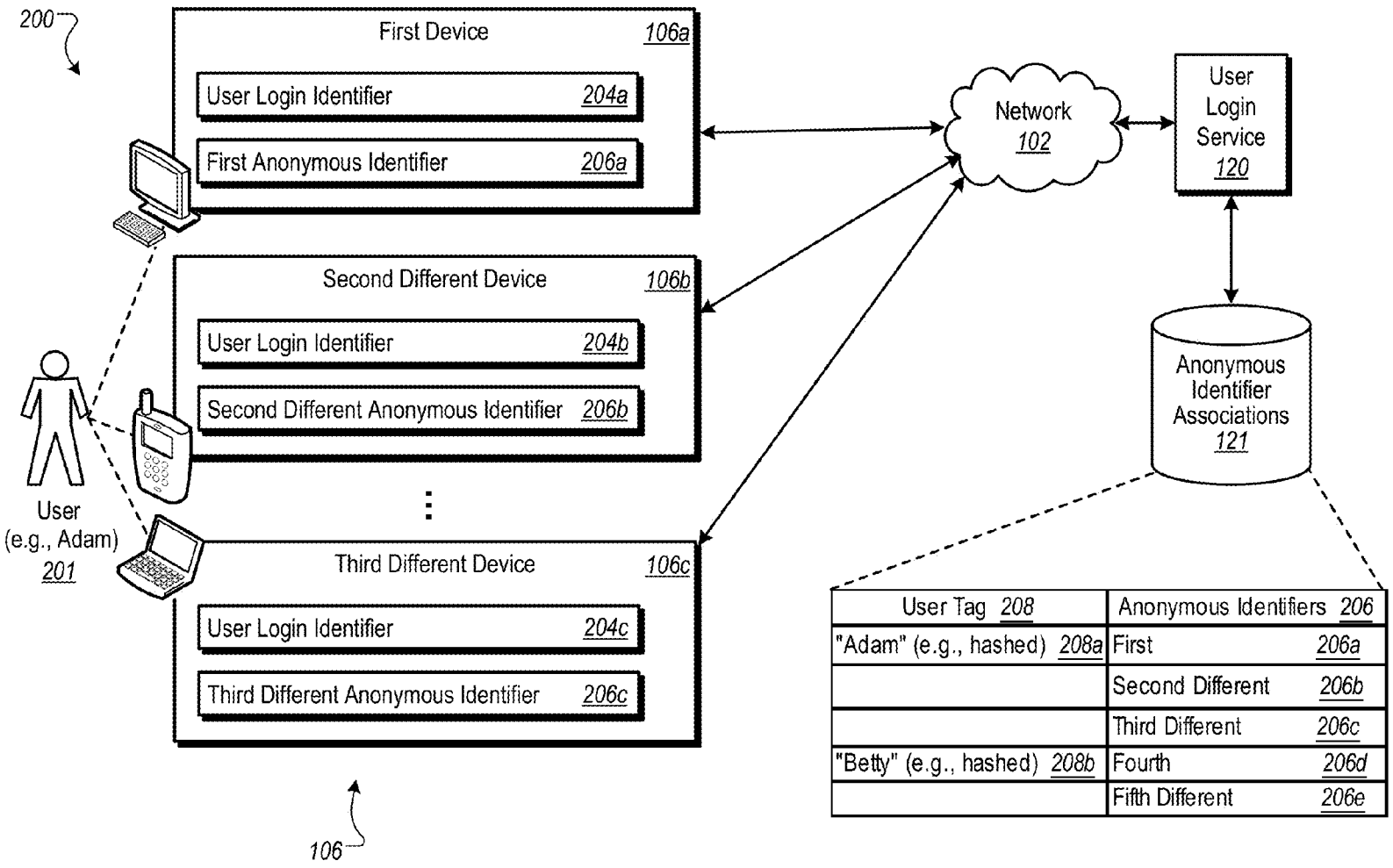
FIGS. 2A and 2B collectively show an example system for providing content to a user who is recognized when using multiple different devices.
Figure 2B:
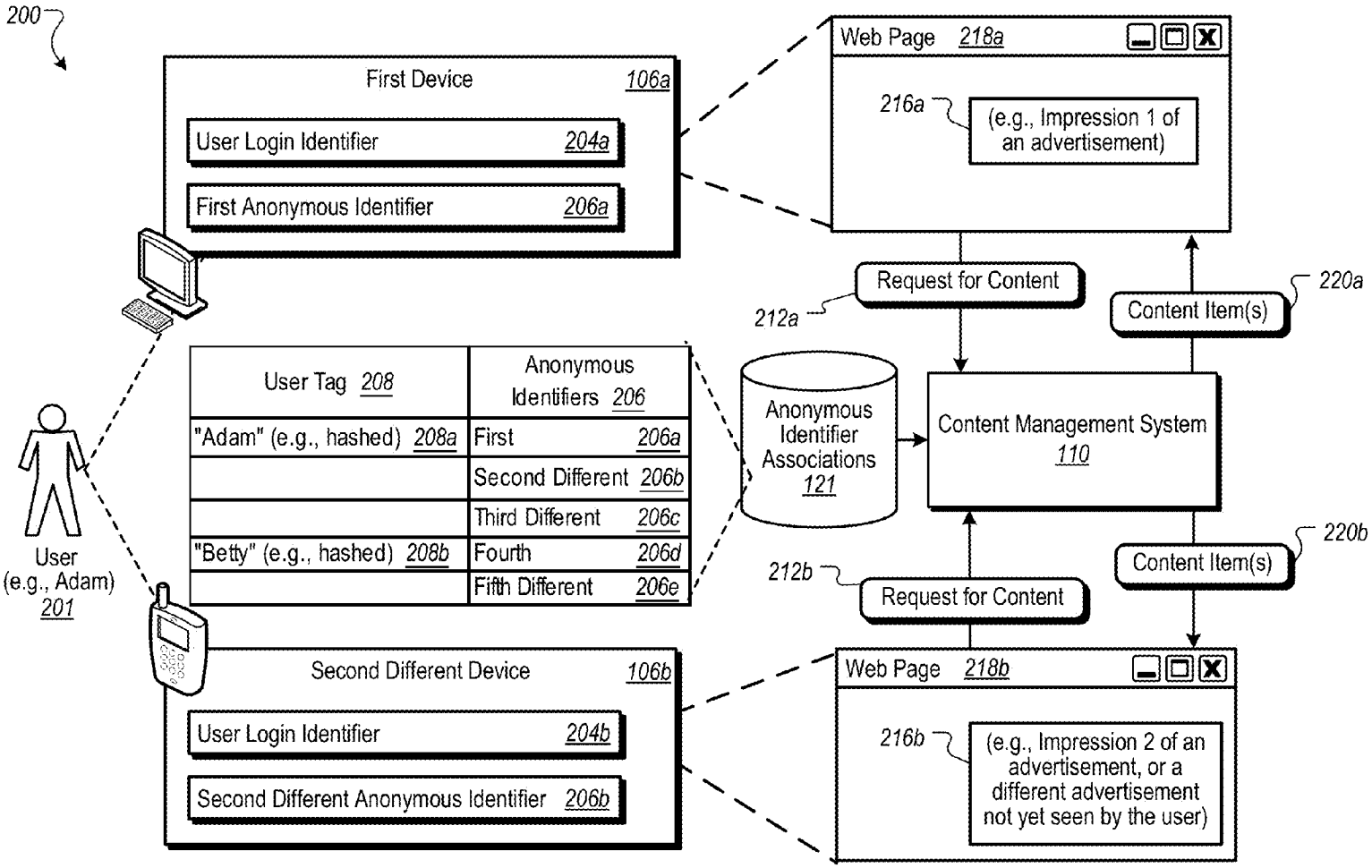

FIGS. 2A and 2B collectively show an example system 200 for providing content to a user who uses multiple devices 106 to retrieve information. For example, the devices 106 used by a user 201 (e.g., Adam) may include a first device 106a (e.g., Adam's home PC), a second device 106b (e.g., a mobile computing device such as Adam's smartphone), a third device 106c (e.g., Adam's work laptop computer), and/or other devices 106. Content that is served, e.g., by the content management system 110, to any of the devices 106 can depend on information that associates the user to all of the multiple devices 106.

Referring to FIG. 2A, the user 201 (e.g., Adam) can log into the user login service 120 from the first device 106a (e.g., Adam's home PC) using a user login identifier 204a that identifies Adam to the user login service 120. For example, the user login identifier 204a can include Adam's login ID (e.g., Adam Jones) or credentials and can be included in a first login request that is received by the login service 120 (e.g., to log Adam into a social service). The login request can be associated with a first anonymous identifier 206a (e.g., a cookie, a browser cookie, a device identifier, etc.) that is associated with the first device 106a.

In some implementations, the user login service 120 can determine a user tag 208a for the user 201, wherein the user tag 208a does not include any personally identifiable information associated with the user. Example personally identifiable information includes a login identifier associated with the user, the user's email address, the user's phone number, and so on.

In some implementations, the user login service 120 can determine the user tag 208a in different ways. For example, determining the user tag 208a can further include determining a random or pseudo-random number based at least in part on the personally identifiable information associated with the user, and the random or pseudo-random number can be provided as the user tag 208a. In some implementations, determining the user tag 208a can further include applying a one-way function (e.g., a hash function) to at least a portion of the personally identifiable information to produce a result, and the result can be used for the user tag 208a. In some implementations, other techniques for determining the user tag 208a can be used, and multiple techniques (e.g., including encryption) can be used in combination.

The user 201 may log into the login service 120 from the second different device 106b (e.g., Adam's smartphone or some other device) using a user login identifier 204b that also identifies Adam. For example, the user login identifier 204b can be the same login identifier that Adam used to log into the first device 106a. In some implementations, the login to the second different device 106b (e.g., Adam's smartphone) can occur while Adam is still logged into the first device 106a (e.g., Adam's home PC). During the second login, the user login service 120, for example, can receive a second login request from the second different device 106b. The second login request can be associated, for example, with a second anonymous identifier 206b (e.g., a cookie, a device identifier, etc.) associated with the second different device 106b.

In some implementations, the first and second different anonymous identifiers can be associated with different browsers. For example, the first device 106a and the second different device 106b can be the same device, but the first anonymous identifier 206a and the second anonymous identifier 206b can each be associated with a different browser. This can occur, for example, if the same user uses two different browsers.

In some implementations, the user login service 120 can store an association between the user tag 208a, the first anonymous identifier 206a, and the second different anonymous identifier 206b in the data store of anonymous identifier associations 121. In some implementations, associations can be stored as pairs that relate the user tags 208 to anonymous identifiers 206. In some implementations, the association that is stored excludes the user tag, as the user tag is the same for each of the login sessions. For example, the association that is stored in this example is between two or more anonymous identifiers. For example, the user tag 208a for Adam can be stored with a first anonymous identifier 206a that corresponds to Adam's login from the first device 106a (e.g., Adam's home PC). In another example, the same user tag 208a for Adam can be stored with a second different anonymous identifier 206b that corresponds to Adam's login from the second different device 106b (e.g., Adam's smartphone). As a result, an association is stored among a user's multiple anonymous identifiers.

Different techniques can be used for storing the association between the user tag 208a and the anonymous identifiers 206a and 206b. In some implementations, storing the association can include storing the information as entries or rows in a table, e.g., where the user tag is mapped to both the first and the second different anonymous identifiers using one or more entries or rows.

In some implementations, storing the association can include removing the user tag after expiration of a first time period and/or removing the second different anonymous identifier after expiration of a second time period. In some implementations, the first and the second time periods can be the same. In some implementations, the first and the second time periods can expire at logout by the user from the service. In some implementations, the first and the second time periods can expire after an amount of time has passed since login that would enable a user to have logged in from multiple different devices. Example amounts of time include substantially two days, substantially three days, substantially four days or substantially one week.

For example, associations that map the user tag associated with Adam to any of Adam's multiple user devices can remain stored for a few days or some other time period in which Adam is likely to log in from multiple different devices. In some implementations, information related to any of Adam's devices can be deleted upon Adam's exit from (or logging off of) the service.

Referring to FIG. 2B, the content management system 110 can receive a request for content 212a or 212b from either the first device 106a or the second different device 106b. For example, the request for content 212a can be a request for an advertisement to fill an advertisement slot 216a on a web page 218a. In another example, the request for content 212b can be a request for an advertisement to fill an advertisement slot 216b on a web page 218b. If the request for content 212a is from the first device 106a, for example, then the request for content can include the first anonymous identifier 206a. Otherwise, if the request for content 212b is from the second different device 106b, for example, then the request for content can include the second different anonymous identifier 206b.

Regardless of where the request for content originates, the content management system 110 can provide a content item (e.g., content items 220a or 220b) in response to the request and using information that maps the user tag to multiple devices (e.g., from the anonymous identifier associations 121). For example, the information can include the association among the user tag 208a, the first anonymous identifier 206a and the second different anonymous identifier 206b. Using this information, the content management system 110 can, for example, treat the requests for content as if they originate from the same user, regardless of the particular user device. In some implementations, identifying eligible content items for the request for content 212b, for example, can depend on content already provided to the same user (e.g., Adam) on the first device 106a. As a result, an advertisement for California vacations that is defined to be provided as one impression per user can be shown on Adam's first device 106a and not repeated again on Adam's second different device 106b. In some implementations, it can be beneficial to provide the same advertisement once and only once to each of the user's multiple devices.

Adam's devices 106a and 106b are two examples of devices that Adam may use. For example, Adam may use a third different device 106c (e.g., a work laptop computer). When Adam uses the third different device 106c to log in, for example, the user login service 120 can store a third different anonymous identifier 206c in the anonymous identifier associations 121. As a result, all three devices 106a-106c can be associated with the user tag 208a associated with Adam.

Similarly, other users (e.g., Betty) can use the user login service 120 for logging in from multiple different devices. As a result of Betty logging into a fourth and a fifth device, for example, the user login service 120 can store fourth and fifth different anonymous identifiers 206d and 206e in the anonymous identifier associations 121 (though those, of course, would be stored in association with Betty, not with Adam).

Figure 3A:
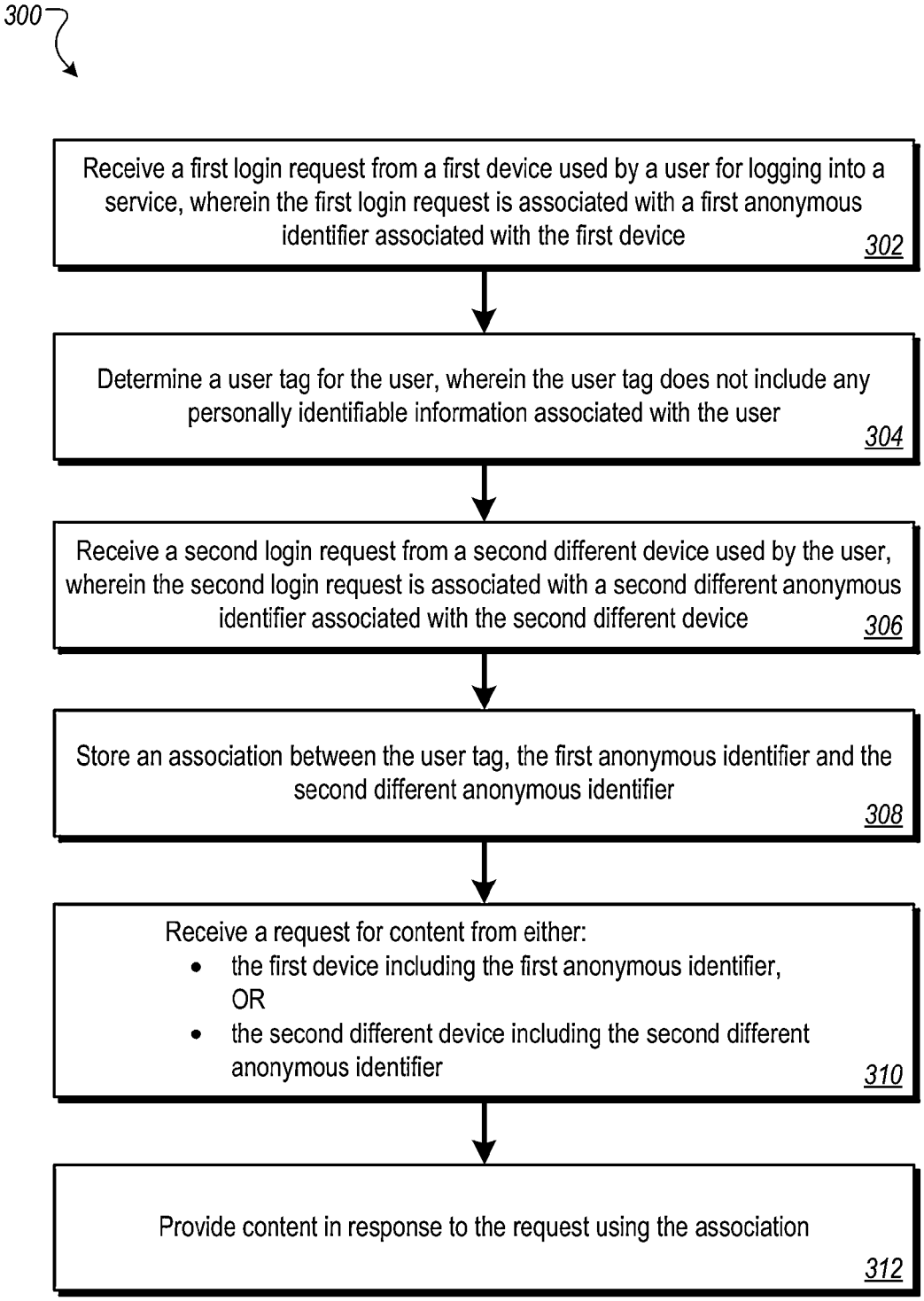
FIG. 3A is a flowchart of an example process for providing content to a user on any of multiple different devices associated with the user.

FIG. 3A is a flowchart of an example process 300 for providing content to a user on any of multiple devices associated with the user. In some implementations, the content management system 110 and/or the user login service 120 can perform steps of the process 300 using instructions that are executed by one or more processors. FIGS. 1-2B are used to provide example structures for performing the steps of the process 300.

A first login request is received from a first device used by a user for logging into a service (302). The first login request is associated with a first anonymous identifier associated with the first device. For example, the user login service 120 can receive the first login request when the user 201 (e.g., Adam) logs into the first device 106a. The user login identifier 204a and the first anonymous identifier 206a can be included with the login request.

A user tag is determined for the user (304). The user tag does not include any personally identifiable information associated with the user. In some implementations, the user login service 120 can determine the user tag 208a using a one-way hash of the login identifier 204a (e.g., a hash of "Adam Jones"). In some implementations, the user login service 120 can determine the user tag 208a as a random or pseudo-random number based on the user's login identifier, e.g., using the user login identifier 204a as a seed. In some implementations, the user tag 208a can further be based, at least in part, on information included in the login request.

A second login request is received from a second different device used by the user (306). The second login request is associated with a second different anonymous identifier associated with the second different device. For example, the user login service 120 can receive the second login request when the user 201 (e.g., Adam) logs into the service from the second different device 106b (e.g., Adam's smartphone). The user login identifier 204b and the second anonymous identifier 206b can be included with the login request.

An association is stored that is between the user tag, the first anonymous identifier and the second different anonymous identifier (308). For example, the user login service 120 can store an association between the user tag 208a, the first anonymous identifier 206a, and the second different anonymous identifier 206b in anonymous identifier associations 121. In some implementations, in order to create the association, the same user tag can be created for the user regardless of on which device the login request originated. For example, the user tag generated for the second request can be the same as the user tag generated for the first request if the user tag is generated using a one-way hash function of the user login identifier. In this way, the user tag can be the same every time the user logs in from any device.

A request for content is received from either the first device including the first anonymous identifier or the second different device including the second different anonymous identifier (310). For example, the content management system 110 can receive a request for content 212a or 212b from either the first device 106a or the second different device 106b, respectively. The request for content 212a (or 212b) can be a request for advertising content such as a request for an advertisement to fill the advertisement slot 216a (or 216b) on the web page 218a (or 218b).

Content is provided in response to the request and using the association (312). For example, the content management system 110 can provide either the content item 220a or 220b, depending on the source of the request. In some implementations, providing content in response to the request can further include using information about the user and providing content that may be of interest to the user. For example, an advertisement for California vacations can be selected based, at least in part, on information associated with the user. Further, the content can be provided to the user to either the first device or the second different device, e.g., where the request for content originated. In some implementations, the delivery of content to the user can be based on stored associations that do not include storing personally identifiable information associated with the user.

In some implementations, the system can store other information regarding the user, such as information that can be used for selecting and providing content that may be of interest to the user. In some implementations, the system stores a profile for the user that can be used for the purposes of, for example, content selection. The profile can be updated based on the session date received from the first or the second device.

In some implementations, the process 300 can include additional steps, e.g., to process a third login request. For example, a login request can be received (e.g., by the user login service 120) from a third device (e.g., device 106c) used by the user. The login request can be associated with a third different anonymous identifier 206c associated with the third device 106c. An association can be stored that associates the user tag 208a, the first anonymous identifier 206a, the second different anonymous identifier 206b and the third different anonymous identifier 206c.

A request for content can be received from either the first device including the first anonymous identifier, the second different device including the second different anonymous identifier, or the third different device including the third different anonymous identifier. Content can be provided (e.g., by the content management system 110) in response to the request and using the association.

Figure 3B:
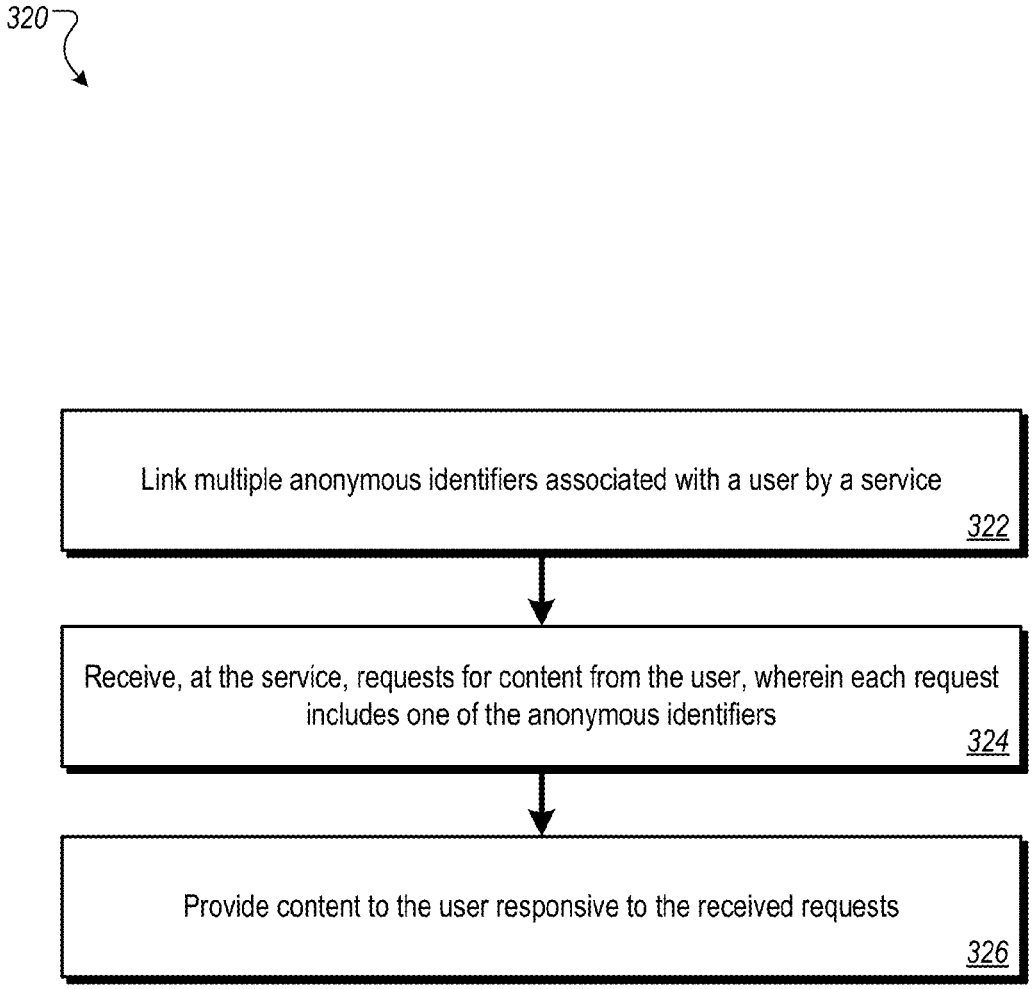
FIG. 3B is a flowchart of an example process for providing content that may be of interest to a user linked to multiple identifiers by a service.

FIG. 3B is a flowchart of an example process 320 for providing content that may be of interest to a user linked to multiple devices (e.g., using identifiers generated by a service). In some implementations, the content management system 110 and/or the user login service 120 can perform steps of the process 320 using instructions that are executed by one or more processors. FIGS. 1-2B are used to provide example structures for performing the steps of the process 320.

Multiple anonymous identifiers associated with a user are linked by a service (322). For example, as a result of multiple login requests by the user 201 (e.g., Adam) on devices 106a-106c, the user login service can link the associated anonymous identifiers 206a-206c using the user tag 208a. For example, the user tag 208a can be a one-way hash of the user login identifier 204a (e.g., Adam Jones).

In some implementations, linking multiple anonymous identifiers can include receiving a login request from the user from plural different devices, determining a user tag associated with the user, wherein the user tag does not include any personally identifiable information associated with the user, and mapping the user tag to an anonymous identifier associated with each login request. For example, the user 201 (e.g., Adam) can log into the user login service 120 from multiple devices 106. For each login request, the user login service 120 can determine the user tag 208a. In some implementations, determining the user tag 208a can include applying a one-way function (e.g., that is repeatable) to unique information associated with the user (e.g., email address, phone number, etc.) and using the result (e.g., a random or pseudo-random number) as the user tag 208a. Further, the user login service 120 can map the user tag 208a to each of the anonymous identifiers (e.g., anonymous identifiers 206a-206c) and store the mappings in the anonymous identifier associations 121. In some implementations, the multiple anonymous identifiers can be browser cookies, device identifiers, or some other identifiers.

Requests for content from the user are received at the service, wherein each request includes one of the anonymous identifiers (324). For example, the content management system 110 can receive requests for content 212a or 212b, e.g., to fill content item slots (e.g., advertisement slots 216a or 216b).

Content is provided to the user responsive to the received requests (326). For example, the content management system 110 can select and provide content items 220a or 220b in response to the requests for content 212a or 212b, respectively. The content management system 110 can use information in the anonymous identifier associations 121. For example, if the content management system 110 identifies eligible content items for a vacation advertising campaign that stipulates a finite number of impressions (e.g., one) for a given advertisement, then the California vacation advertisement that content management system 110 provides to Adam on Adam's home PC may not be repeated on Adam's smartphone.

Figure 3C:
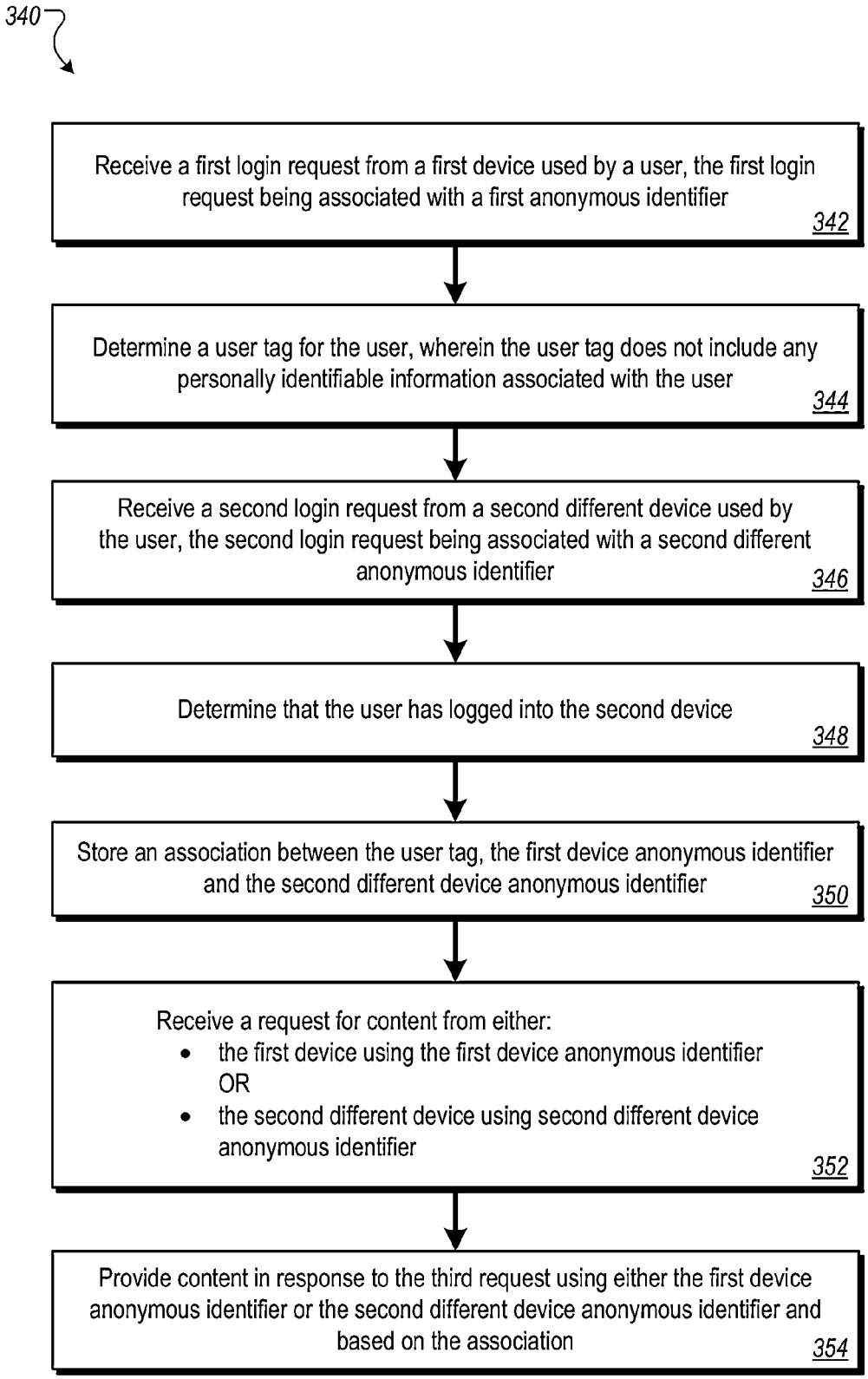
FIG. 3C is a flowchart of an example process for providing content to a user who is associated with different devices.

FIG. 3C is a flowchart of an example process 340 for providing content to a user who is associated with different devices. In some implementations, the content management system 110 and/or the user login service 120 can perform steps of the process 340 using instructions that are executed by one or more processors. FIGS. 1-2B are used to provide example structures for performing the steps of the process 340.

A first login request is received from a first device used by a user, the first login request being associated with a first anonymous identifier (342). As an example, the user login service 120 can receive the first login request when the user 201 (e.g., Adam) logs into the first device 106a. The user login identifier 204a and the first anonymous identifier 206a can be included with the login request.

A user tag is determined for the user, wherein the user tag does not include any personally identifiable information associated with the user (344). In some implementations, the user login service 120 can determine the user tag 208a using a one-way hash of the login identifier 204a (e.g., a hash of "Adam Jones"). In some implementations, the user login service 120 can determine the user tag 208a as random number, e.g., using the user login identifier 204a as a seed. In some implementations, the user tag can further be based, at least in part, on information included in the login request.

A second login request is received from a second different device used by the user, the second login request being associated with a second different anonymous identifier (346). For example, the user login service 120 can receive the second login request when the user 201 logs into the service from the second different device 106b (e.g., Adam's smartphone). The user login identifier 204b and the second anonymous identifier 206b can be included with the login request.

It is determined that the user has logged into the second device (348). For example, the user login service 120 can determine, based on the request, that the user 201 has logged into the second different device 106b.

An association is stored that is between the user tag, the first device anonymous identifier and the second different device anonymous identifier (350). As an example, the user login service 120 can store an association between the user tag 208a, the first anonymous identifier 206a, and the second different anonymous identifier 206b in anonymous identifier associations 121.

A request for content is received from either the first device using the first device anonymous identifier or from the second different device using the second different device anonymous identifier (352). For example, the content management system 110 can receive a request for content 212a or 212b from either the first device 106a or the second different device 106b, respectively. The request for content 212a (or 212b) can be, for example, a request for an advertisement to fill the advertisement slot 216a (or 216b) on the web page 218a (or 218b).

Content is provided in response to the third request using either the first device anonymous identifier or the second different device anonymous identifier and based on the association (354). For example, the content management system 110 can provide either the content item 220a or 220b, depending on the source of the request.

Figure 3D:
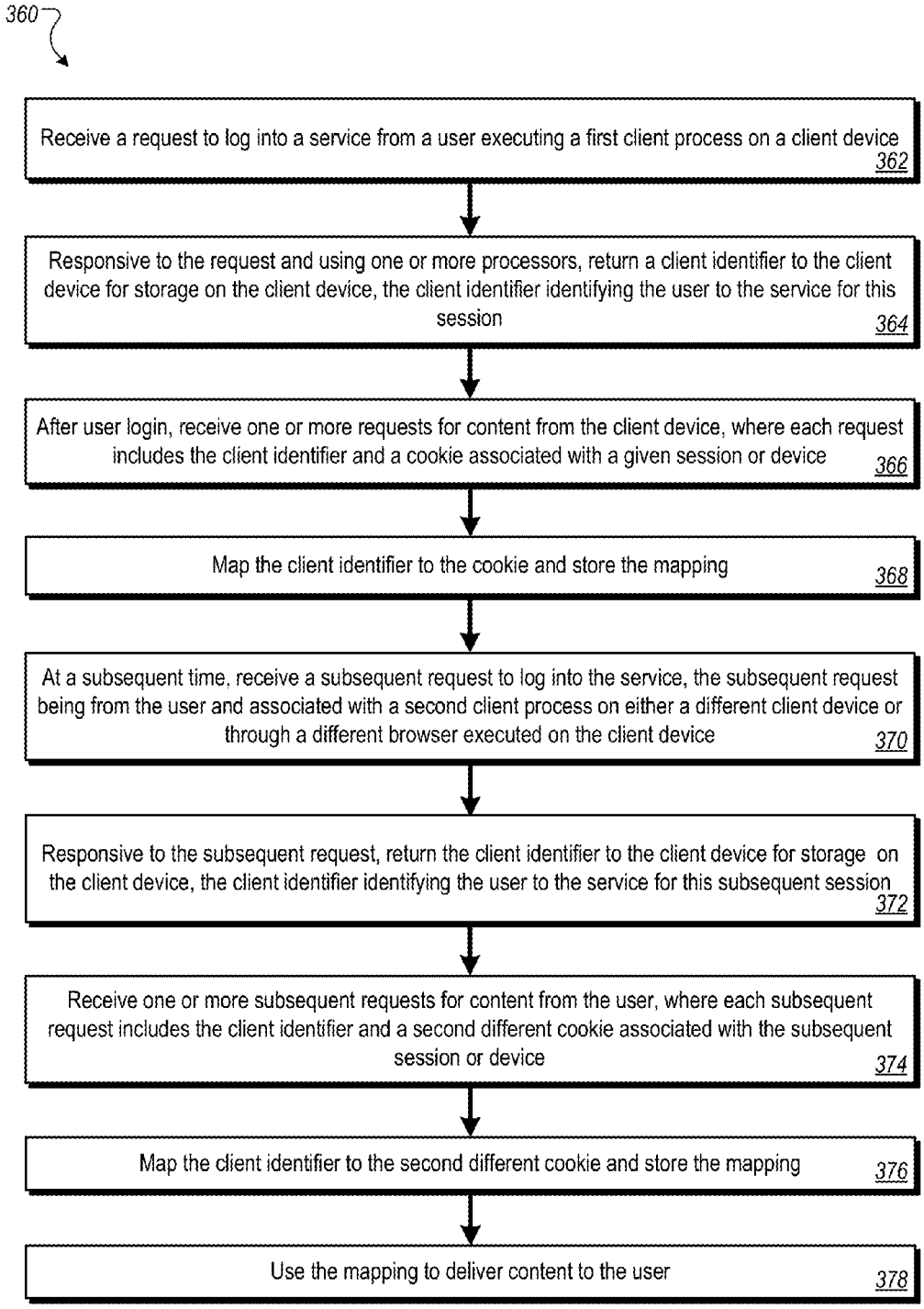
FIG. 3D is a flowchart of an example process for delivering content to a user who is associated with different devices.

FIG. 3D is a flowchart of an example process 360 for delivering content to a user who is associated with different devices. In some implementations, the content management system 110 and the user login service 120 can perform steps of the process 360 using instructions that are executed by one or more processors. FIGS. 1-2B are used to provide example structures for performing the steps of the process 360.

A request to log into a service is received from a user executing a first client process on a client device (362). For example, the user 201 (e.g., Adam) may log into the user login service 120 (e.g., from a toolbar) to access a service (e.g., email, social networking application, etc.), access to which can be controlled by the user login service 120. As a result, the user login service 120 can receive a login request from the first device 106a (e.g., Adam's home PC), such as from a web browser or other client process that is executing on Adam's first device 106a.

Responsive to the request and using one or more processors, a client identifier is returned to the client device for storage on the client device, the client identifier identifying the user to the service for this session (364). For example, the user login service 120 can determine a client identifier that identifies the user (e.g., Adam) but contains no personally identifiable information associated with the user. In some implementations, the client identifier can be a cookie. In some implementations, the client identifier can be determined using a one-way hash of the user login identifier (e.g., Adam Jones or his login identifier) that was provided by the user when logging in. In some implementations, the client identifier can be a random number or some other identifier.

After logging in, one or more requests for content are received from the client device, where each request includes the client identifier and a cookie associated with a given session or device (366). As an example, the content management system 110 can receive a request for content 212a from the first device 106a, e.g., a request to fill the advertisement slot 216a on the web page 218a. In some implementations, the content management system 110 can also receive a cookie associated with Adam's session on the first device 106a. The cookie received may be a copy of a cookie stored on the first device 106a and that identifies the device.

The client identifier is mapped to the cookie, and the mapping is stored (368). For example, the user login service 120 can store a mapping between the client identifier and the cookie, e.g., in anonymous identifier associations 121. In some implementations, the mapping can include storing information used for providing content to the user based on mapping. For example, information stored with the mapping can be used for conversion tracking, frequency capping, demographic and interest category inferences, remarketing and/or other uses. In some implementations, information stored with the mapping can include inferences about a user (e.g., interests, user purchase intent or other information). The inferences learned from one device can be used to select and provide advertisements to the user when he/she is using another device. Other means for storing information about the user are possible, such as of the form of a user profile.

At a subsequent time, a subsequent request is received to log into the service, the subsequent request being from the user and associated with a second client process on either a different client device or through a different browser executed on the client device (370). For example, the user login service 120 can receive a login request from the same user 201 (e.g., Adam) on the second different device 106b (e.g., Adam's smartphone). This can occur, for example, while Adam is still logged onto his first device 106a (e.g., Adam's home PC).

Responsive to the subsequent request, the client identifier is returned to the client device for storage on the client device, the client identifier identifying the user to the service for this subsequent session (372). For example, the same client identifier that is returned to Adam's first device 106a can be returned to Adam's second different device 106b.

One or more subsequent requests for content are received from the user, where each subsequent request includes the client identifier and a second different cookie associated with the subsequent session or device (374). As an example, the content management system 110 can receive the request for content 212b from the second different device 106b, e.g., a request to fill the advertisement slot 216b on the web page 218b on Adam's smartphone. At the same time, the content management system 110 can also receive the second different cookie associated with Adam's session on the second different device 106b.

The client identifier is mapped to the second different cookie, and the mapping is stored (376). For example, the user login service 120 can store a mapping between the client identifier and the second different cookie, e.g., in anonymous identifier associations 121. As a result, an association now exists among the client identifier, the cookie (e.g., from the first device 106a) and the second different cookie (e.g., from the second different device 106b).

Using the mapping, content is delivered to the user (378). For example, the content management system 110 can use the mapping to provide content items for a vacation advertising campaign, e.g., that stipulates a finite number of impressions (e.g., one) to any one user for a given advertisement. As a result, a California vacation advertisement, for example, that the content management system 110 provides to Adam on Adam's home PC will not be repeated on Adam's smartphone.

Figure 4:
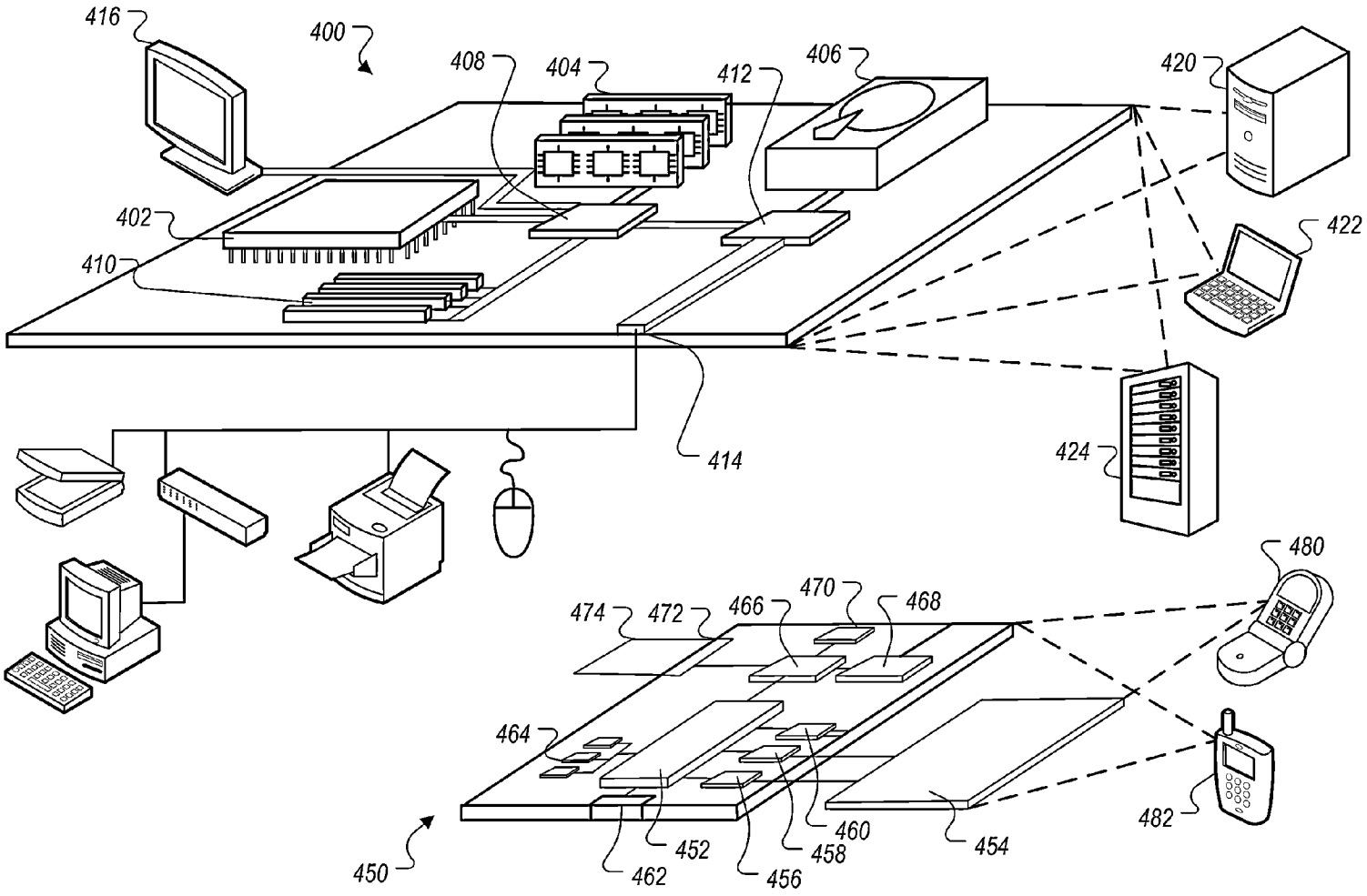
FIG. 4 is a block diagram of an example computer system that can be used to implement the methods, systems and processes described in this disclosure.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processers embedded therein or attached thereto. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a subscriber identification module (SIM) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:

receiving, *by one or more processors,* a first login request from a first device used by a user for logging into a service;

after logging in the user based on the [received] first login request, identifying, *by the one or more processors,* a first anonymous identifier that is associated with the user wherein identifying includes either receiving the first anonymous identifier during a session while the user is logged in or locating the first anonymous identifier that is associated with the user and was received prior to the login;

determining, [using] *by the* one or more processors [and], *using* personal information associated with the user that is unique to the user, a user tag for the user including constructing the user tag by obfuscating at least a portion of the personal information, wherein the user tag does not include any personally identifiable information associated with the user;

receiving, *by the one or more processors,* a second login request from a second [different] device used by the user;

after logging in the user based on the [received] second login request, identifying, *by the one or more processors,* a second anonymous identifier that is associated with the user, wherein identifying includes either receiving the second anonymous identifier during a session while the user is logged in or locating the second anonymous identifier that is associated with the user and was received prior to the login, wherein the second anonymous identifier is different from the first anonymous identifier;

after identifying the second anonymous identifier, storing, *by the one or more processors,* an association between the user tag, the first anonymous identifier and the second [different] anonymous identifier, the association anonymously linking the user with the first device and the second [different] device;

receiving, *by the one or more processors,* a request for content from either:

the first device wherein the request *for content* includes the first anonymous identifier; or the second [different] device wherein the request *for content* includes the second [different] anonymous identifier;

using, *by the one or more processors,* the [received] first anonymous identifier *or the second anonymous identifier received in the request for content* to [locate] *identify* a plurality of [different] devices that are [mapped] *linked* to the user including [locating] *identifying* another of the first or second [different] device;

determining, [using] *by* the one or more processors, session history information associated with each *of* the user's use of the first and second [different] device;

creating, [using] *by* the one or more processors, *in response to the request for content,* aggregated session history using the determined session history information; and providing, [using] *by* the one or more processors, content in response to the request *for content* using the association and the aggregated session history.

2. The method of claim 1 wherein the first and second [different] anonymous identifiers are associated with different browsers.

3. The method of claim 1 wherein receiving the login request includes receiving a request to log into a social service.

4. The method of claim 1 wherein determining a user tag for the user further includes determining a random or pseudo-random number based at least in part on the personal information and providing the random or pseudo-random number as the user tag.

5. The method of claim 1 wherein determining a user tag for the user further includes applying a one-way function to at least a portion of the personal information producing a result and using the result as the user tag.

6. The method of claim 5 wherein the one-way function is a hash function.

7. The method of claim 5 wherein the portion of information is a login identifier associated with the user.

8. The method of claim 5 wherein the portion of information is an email address of the user.

9. The method of claim 1 wherein storing the association includes storing the user tag, the first anonymous identifier, and the second [different] anonymous identifier as [an entry] *entries* in a table.

10. The method of claim 1 wherein storing the association includes mapping the user tag to both the first and the second [different] anonymous identifiers.

11. The method of claim 1 wherein storing the association includes removing the user tag after expiration of a first time period.

12. The method of claim 11 wherein storing the association includes removing the second [different] anonymous identifier after expiration of a second time period.

13. The method of claim 12 wherein the first and the second time periods are the same.

14. The method of claim 11 wherein the first and the second time periods expire at logout by the user from the service.

15. The method of claim 11 wherein the first and the second time periods expire after an amount of time has passed since login that would enable a user to have logged in from multiple [different] devices.

16. The method of claim 1 wherein the first and second [different] anonymous identifiers [are selected from a group comprising] *include at least one of* a browser cookie and a device identifier.

17. The method of claim 1 further comprising:

receiving a login request from a third device used by the user, the login request being associated with a third [different] anonymous identifier associated with the third device, *the third anonymous identifier different from the first and second anonymous identifiers*;

storing an association between the user tag, the first anonymous identifier, the second [different] anonymous identifier and the third [different] anonymous identifier;

receiving a request for content from either:

the first device including the first anonymous identifier;

the second [different] device including the second [different] anonymous identifier; or the third [different] device including the third [different] anonymous identifier; and providing content, in response to the request [and] *for content,* using the association.

18. The method of claim 1 wherein receiving a request for content includes receiving a request for advertising content.

19. The method of claim 1 wherein receiving a request for content includes receiving a request from the first device including the first anonymous identifier, where the first anonymous identifier is a cookie.

20. The method of claim 1 wherein providing content in response to the request further includes using information about the user to provide content to the user.

21. A computer-implemented method comprising:

receiving, *by one or more processors,* a first login request from a first device used by a user;

after logging in the user based on the received first login request, identifying, *by the one or more processors,* a first anonymous identifier that is associated with the user wherein identifying includes either receiving the first anonymous identifier during a session while the user is logged in or locating the first anonymous identifier that is associated with the user and was received prior to the login;

determining, [using] *by the* one or more processors [and], *using* personal information associated with the user that is unique to the user, a user tag for the user, including constructing the user tag by obfuscating at least a portion of the personal information, and providing the user tag to the first device, wherein the user tag does not include any personally identifiable information associated with the user;

receiving, *by the one or more processors,* a second login request from a second [different] device used by the user;

after logging in the user based on the received second login request, identifying, *by the one or more processors,* a second anonymous identifier that is associated with the user wherein identifying includes either receiving the second anonymous identifier during a session while the user is logged in or locating the second anonymous identifier that is associated with the user and was received prior to the login, wherein the second anonymous identifier is different from the first anonymous identifier;

determining, *by the one or more processors,* that the user has logged into the second [different] device;

after identifying the second anonymous identifier, storing, *by the one or more processors,* an association between the user tag, the first anonymous identifier and the second [different] anonymous identifier, the association anonymously linking the user with the first device and the second [different] device;

receiving, *by the one or more processors,* a request for content from either:

the first device wherein the request *for content* includes the first anonymous identifier; or the second [different] device [using] wherein the request *for content* includes the second [different] anonymous identifier;

using, *by the one or more processors,* the [received] first anonymous identifier *or the second anonymous identifier received in the request for content* to [locate] *identify* a plurality of [different] devices that are [mapped] *linked* to the user including [locating] *identifying* another of the first or second [different] device;

determining, [using] *by* the one or more processors, session history information associated with each *of* the user's use of the first and second [different] device;

creating, [using] *by* the one or more processors, *in response to the request for content,* aggregated session history using the determined session history information; and providing, [using] *by* the one or more processors, content in response to the request for content using either the first anonymous identifier or the second [different] anonymous identifier and based on the association and the aggregated session history.

22. A computer program product tangibly embodied in a computer-readable storage device and comprising instructions that, when executed by a processor, cause the processor to:

receive a first login request from a first device used by a user for logging into a service;

after logging in the user based on the received first login request, identify a first anonymous identifier that is associated with the user wherein identifying includes either receiving the first anonymous identifier during a session while the user is logged in or locating the first anonymous identifier that is associated with the user and was received prior to the login;

determine, using personal information associated with the user that is unique to the user, a user tag for the user including constructing the user tag by obfuscating at least a portion of the personal information, wherein the user tag does not include any personally identifiable information associated with the user;

receive a second login request from a second [different] device used by the user;

after logging in the user based on the received second login request, identify a second anonymous identifier that is associated with the user wherein identifying includes either receiving the second anonymous identifier during a session while the user is logged in or locating the second anonymous identifier that is associated with the user and was received prior to the login, wherein the second anonymous identifier is different from the first anonymous identifier;

after identifying the second anonymous identifier, store an association between the user tag, the first anonymous identifier and the second [different] anonymous identifier, the association anonymously linking the user with the first device and the second [different] device;

receive a request for content from either:

the first device [including] wherein the request *for content* includes the first anonymous identifier; or the second [different] device wherein the request *for content* includes the second [different] anonymous identifier;

use the [received] first anonymous identifier *or the second anonymous identifier received in the request for content* to [locate] *identify* a plurality of [different] devices that are [mapped] *linked* to the user including [locating] *identifying* another of the first or second [different] device;

determine[, using the one or more processors,] session history information associated with each *of* the user's use of the first and second [different] device;

create, [using the one or more processors] *in response to the request for content*, aggregated session history using the determined session history information; and provide content in response to the request *for content* using the association and the aggregated session history.

* * * * *